United States Patent
Zhang et al.

(10) Patent No.: US 9,734,567 B2
(45) Date of Patent: Aug. 15, 2017

(54) LABEL-FREE NON-REFERENCE IMAGE QUALITY ASSESSMENT VIA DEEP NEURAL NETWORK

(71) Applicant: Samsung Electronics Co., Ltd., Suwon-si, Gyeonggi-do (KR)

(72) Inventors: Qiang Zhang, Pasadena, CA (US); Zhengping Ji, Temple City, CA (US); Lilong Shi, Pasadena, CA (US); Ilia Ovsiannikov, Studio City, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 14/931,843

(22) Filed: Nov. 3, 2015

(65) Prior Publication Data

US 2016/0379352 A1 Dec. 29, 2016

Related U.S. Application Data (60) Provisional application No. 62/184,211, filed on Jun. 24, 2015.

(51) Int. Cl.
 *G06K 9/62* (2006.01)
 *G06T 7/00* (2017.01)
 *G06N 3/08* (2006.01)
 *G06N 3/04* (2006.01)

(52) U.S. Cl.
 CPC ............ *G06T 7/0002* (2013.01); *G06N 3/04* (2013.01); *G06N 3/08* (2013.01); *G06T 2207/20008* (2013.01); *G06T 2207/20081* (2013.01); *G06T 2207/30168* (2013.01)

(58) Field of Classification Search
 CPC ......... G06T 7/0002; G06T 2207/30168; G06T 2207/20008; G06T 2207/20081; G06N 3/08; G06N 3/04
 USPC .................................................. 382/156–158
 See application file for complete search history.

(56) References Cited

U.S. PATENT DOCUMENTS

| | | | |
|---|---|---|---|
| 5,642,433 A * | 6/1997 | Lee .................... | G06T 7/0002 382/199 |
| 8,873,813 B2 | 10/2014 | Tadayon et al. | |
| 2003/0095683 A1* | 5/2003 | Najarian ............. | G06T 1/0028 382/100 |
| 2015/0110348 A1 | 4/2015 | Solanki et al. | |
| 2015/0125049 A1 | 5/2015 | Taigman et al. | |
| 2016/0358321 A1* | 12/2016 | Xu ...................... | G06T 7/0002 |

FOREIGN PATENT DOCUMENTS

WO 2014205231 A1 12/2014

* cited by examiner

*Primary Examiner* — Andrew Moyer
(74) *Attorney, Agent, or Firm* — Renaissance IP Law Group LLP (57) ABSTRACT

A method for training a neural network to perform assessments of image quality is provided. The method includes: inputting into the neural network at least one set of images, each set including an image and at least one degraded version of the image; performing comparative ranking of each image in the at least one set of images; and training the neural network with the ranking information. A neural network and image signal processing tuning system are disclosed.

15 Claims, 5 Drawing Sheets

Fig. 3B $\mathbf{x}_i$   $\mathbf{x}_j$

LABEL-FREE NON-REFERENCE IMAGE QUALITY ASSESSMENT VIA DEEP NEURAL NETWORK

BACKGROUND

1. Field

The techniques disclosed herein relate to image quality assessment, and in particular, to implementations of a deep neural network for qualification of images.

2. Description of the Related Art

There is an increasing demand for capabilities that provide for automatic assessment of image quality. Automatic assessment of image quality is not only useful for a variety of commercial and industrial applications, but also valuable to producers of imaging equipment. Typically, algorithms assessing quality of an image have required an ideal image, or "reference image" as a standard for comparison. Clearly, this can be problematic, as in many cases the reference images are not available.

The more useful and efficient alternatives are able to measure image quality without a reference image. This type of image assessment is referred to as non-reference image quality assessment (NRIQA). Generally, existing non-reference image quality assessment (NRIQA) methods suffer from two constraints: (1) requirement of hand-crafted features and (2) requirement of training data that is labeled with a quality score. Quite often, those require manual processing (i.e., human interaction). This can be time consuming and result in subjective interpretations. These two constraints make the non-reference image quality assessment (NRIQA) methods difficult to design and limit their applicability.

Thus, what are needed are improved techniques for more effectively and efficiently assessing quality of graphic images. The techniques should provide for automatic processing, and lend themselves to a variety of applications that require high quality assessments of image quality.

SUMMARY

In one embodiment, a method for training a neural network to perform assessments of image quality is provided. The method includes: inputting into the neural network at least one set of images, each set including an image and at least one degraded version of the image; performing comparative ranking of each image in the at least one set of images; and training the neural network with the ranking information.

In some embodiments, the comparative ranking may be performed in a comparative layer. The comparative layer may implement a sigmoid function to provide pairwise ranking of the images within each set of images. The sigmoid function may include:

$$h(y_i, y_j) = \frac{1}{1 + e^{l_{i,j}(y_i - y_j)}};$$

wherein, $y_i$ and $y_j$ represent output quality scores associated with input images, $x_i$ and $x_j$, respectively; and $l_{i,j}$ represents prior information for pairwise ranking of $y_i$ and $y_j$ output by the comparative layer.

Learning rules for the comparative layer may include:

$$\frac{\partial}{\partial y_i} = -l_{i,j} \frac{1}{1 + e^{l_{i,j}(y_i - y_j)}} \left(1 - \frac{1}{1 + e^{l_{i,j}(y_i - y_j)}}\right);$$

$$\frac{\partial}{\partial y_j} = l_{i,j} \frac{1}{1 + e^{l_{i,j}(y_i - y_j)}} \left(1 - \frac{1}{1 + e^{l_{i,j}(y_i - y_j)}}\right); \text{ and } \frac{\partial}{\partial f} =$$

$$\Sigma_{i,j} - \frac{1}{1 + e^{l_{i,j}(f(x_i) - f(x_j))}} \left(1 - \frac{1}{1 + e^{l_{i,j}(f(x_i) - f(x_j))}}\right) l_{i,j} \frac{\partial(f(x_i) - f(x_j))}{\partial f};$$

wherein $f$ represents function consisting of weights that map input to output quality scores for layers of the neural network.

Each image within each set of images may be label-free. The training may include back propagation of the neural network. The method may further include providing the degraded image by degrading the first image with a pre-processing algorithm. The pre-processing algorithm may incorporate at least one type of distortion into the first image.

In another embodiment, a neural network configured for performing assessments of image quality is provided. The neural network includes: an input for receiving at least one set of training images, each set including an image and at least one degraded version of the image; and a comparative layer configured for performing comparative ranking of each image in the at least one set of training images for image quality assessment; the neural network configured to learn image quality scoring from the rankings performed by the comparative layer.

In some embodiments, the comparative layer may implement a sigmoid function to provide pairwise ranking of the images within each set of images.

The sigmoid function may include:

$$h(y_i, y_j) = \frac{1}{1 + e^{l_{i,j}(y_i - y_j)}};$$

wherein, $y_i$ and $y_j$ represent output quality scores associated with input images, $x_i$ and $x_j$, respectively; and $l_{i,j}$ represents pairwise ranking information of $y_i$ and $y_j$ output by the comparative layer.

Learning rules for the comparative layer may include:

$$\frac{\partial}{\partial y_i} = -l_{i,j} \frac{1}{1 + e^{l_{i,j}(f(x_i) - f(x_j))}} \left(1 - \frac{1}{1 + e^{l_{i,j}(f(x_i) - f(x_j))}}\right);$$

$$\frac{\partial}{\partial y_j} = l_{i,j} \frac{1}{1 + e^{l_{i,j}(f(x_i) - f(x_j))}} \left(1 - \frac{1}{1 + e^{l_{i,j}(f(x_i) - f(x_j))}}\right); \text{ and } \frac{\partial}{\partial f} =$$

$$\Sigma_{i,j} - \frac{1}{1 + e^{l_{i,j}(f(x_i) - f(x_j))}} \left(1 - \frac{1}{1 + e^{l_{i,j}(f(x_i) - f(x_j))}}\right) l_{i,j} \frac{\partial(f(x_i) - f(x_j))}{\partial f};$$

wherein $f$ represents function consisting of weights that map input to output quality scores for layers of the neural network.

The comparative layer and ranking may not be necessary when the neural network performs assessment of image qualities using learned weights. The quality score of the incoming image may be computed directly via the mapping function consisting of learned weights.

Output of the neural network may be configured for use by an automated image signal processing tuning system.

In another embodiment, an image signal processing tuning system is provided. The image signal processing tuning system includes: an image signal processor (ISP) adapted for providing at least one set of training images to a neural network, each set of training images including a first image and a degraded version of the first image; the neural network configured for performing comparative ranking of each training image in the at least one set of training images; and a controller configured for receiving ranking information and adjusting settings of parameters of the image signal processor (ISP) according to the ranking information.

In some embodiments, the image signal processor (ISP) is configured to provide production images that are unrelated to the training images. The neural network may be further configured provide image scoring information for the production images; and the image scoring information may be provided to the controller for adjusting settings of parameters of the image signal processor (ISP) according to the image scoring information.

The image signal processor (ISP) may be equipped with an imaging sensor and includes one of: a camera, a mobile device, a smart phone, a tablet, a specialized device. The controller may be implemented by a set of machine readable instructions stored on non-transitory machine readable media.

BRIEF DESCRIPTION OF THE DRAWINGS

The features and advantages of the teachings disclosed herein are apparent from the following description taken in conjunction with the accompanying drawings in which.

DETAILED DESCRIPTION

Disclosed herein are techniques for performing image quality assessment by use of a deep neural network. Advantageously, the techniques for non-reference image quality assessment (NRIQA) that are disclosed herein do not require a reference image. Further, manual annotation or qualification of imagery is not required. Image quality is learned automatically, and no image quality score is required for labeling of training images.

The techniques disclosed herein take advantage of processing capabilities provided by a deep neural network, with the addition of a comparative layer (called CMP layer) that includes a cost function adapted for implementation of non-reference image quality assessment (NRIQA). The techniques disclosed herein take advantage of relative attributes. The neural network uses computationally inexpensive pairwise ranking information to learn the network, rather than conventional labeled quality scores.

The techniques disclosed herein for non-reference image quality assessment (NRIQA) provide output that includes reliable assessments of image quality. The output may be used in a variety of ways. For example, improved images may be used to enhance other processes such as security surveillance, environmental surveillance, for diagnostic imaging and other medical applications, and in any other setting where quality images are desired.

Additionally, the techniques disclosed herein for non-reference image quality assessment (NRIQA) may be performed on a rapid basis. That is, non-reference image quality assessment (NRIQA) may be performed in a substantially real-time environment. As a result, the techniques for non-reference image quality assessment (NRIQA) may be used as part of a feedback mechanism to enhance image collection. That is, output from the non-reference image quality assessment (NRIQA) processes may be used to adjust aspects such as lighting, focus, aperture settings, sensor speed, image stabilization, and other parameters that may be adjusted to improve imaging processes.

In order to provide some context for the teachings herein, some aspects are now introduced.

As discussed herein, the term "neural network" generally refers to software that implements statistical learning algorithms that are of an adaptive nature and are useful in machine learning. The neural network may include a plurality of artificial nodes, known as "neurons," "processing elements," "units," or by other similar terms and which are connected together to form a network which mimics a biological neural network. Generally, a neural network includes sets of adaptive weights (i.e. numerical parameters that are tuned by a learning algorithm), and are capable of approximating non-linear functions of their inputs. The adaptive weights are conceptually connection strengths between neurons, which are activated during training and prediction. Generally, a neural network operates on a principle of non-linear, distributed, parallel and local processing and adaptation. Generally, the first layer is called the "input layer," and the neurons within the layer are called input neurons. The "output layer" contains output neurons. Intermediate layers are called "hidden layers," since the neurons in these layer are neither inputs nor outputs. Neurons may include feature detectors, gradients, and other such components.

In general, "convolution" is a mathematical operation on two functions, $f$ and $g$, and produces a third function that may be viewed as a modified version of one of the original functions. The third function generally includes area overlap between the two functions as a function of the amount that one of the original functions is translated.

In general, the term "convolutional neural network (CNN)" refers to a type of neural network where the individual neurons are tiled in such a way that they respond to overlapping regions in the visual field. Generally, the convolutional neural network (CNN) will employ local receptive fields, shared weights, and pooling to process imagery. Local receptive fields may be considered as connections of input pixels to a layer of hidden neurons. As an example, each neuron in the first hidden layer corresponds to a small, localized region of the input image. The region of the input image that corresponds to the hidden neuron is called the "local receptive field" for that hidden neuron. Each of the hidden neurons in the first hidden layer use the same weights and bias as the other hidden neurons, and thus have "shared weights." This means that all the neurons in the first hidden layer detect exactly the same feature just in different locations. The resulting map from the input layer is referred to as a "feature map," and the weights defining the feature map as the "shared weights." "Pooling layers" are usually used immediately after convolutional layers. Pooling layers simplify the information in the output from the convolutional layer. That is, a pooling layer takes each feature map output from the convolutional layer and prepares a condensed feature map. One common procedure for pooling is known as "max-pooling." In max-pooling, a pooling unit simply outputs the maximum activation of the input region (output from the feature map).

The deep convolution neural network (CNN) can be described as stacks of convolution layers, interlaced with normalization layer, pooling layer (which down samples the input spatially) and/or layers of other types, with fully connected layers and cost layers (e.g., logistic regression) in the top. Each convolution layer is parameterized by a set of filters, for example, a filter in the first layer which takes an RGB image as input and provides a response. The power of the deep CNN comes from the deeply stacked layers, which starts with simple features (for example, raw RGB image data) and learns more and more complex feature through the layers, where subsequent layers can be used to identify high level semantics.

As discussed herein, the terms "filter" and "kernel" generally refers to a layer of connection weights. When using an image as input to the filter, the input includes a small two-dimensional image patch, and the output is then a single unit. Since the filter is applied repeatedly, the resulting connectivity looks like a series of overlapping receptive fields.

As discussed herein, the term "feature detector" generally refers to a set of techniques that learn a transformation of data input and provide a representation that can be used by the neural network.

As discussed herein, the term "subsampling," or "downsampling," generally refers to reducing the overall size of a signal. In the case of two-dimensional filter outputs, such as used for image processing, subsampling can also be thought of as increasing the position invariance of the filters. One technique referred to as "max pooling," involves taking the maximum value in each grid as the value in the reduced matrix. Semantically, this corresponds to changing the question answered by the convolution layer from "how well does this filter apply right here" to "how well does this filter apply to this area." By applying such a max pooling layer in between convolutional layers, spatial abstractness can be increased along with increases in feature abstractness.

As discussed herein, the term "image" refers to a two-dimensional array of digitized image data, however, this is merely illustrative and is not limiting. As discussed herein, images provided to the server may be collected by another device such as a remote input device (such as a camera incorporated into a mobile device) and prepared for training by intermediate tools (such as a software client) and configured to mimic the form of images provided by the client (for example). Images collected by the client may be provided in a digitized form (such as from a camera in the mobile device). In exemplary embodiments, aspects such as dimensions and number of pixels of training images are generally equivalent to the dimensions and number of pixels of production images. Further, merely for purposes of distinguishing training images from other images collected during operation of the client, images used for training the neural network are referred to as "training images." Images collected by the client for subsequent analysis by a given neural network are referred to as "production images" and by other similarly distinct terms.

As discussed herein, the term "production" generally refers to use of a neural network to analyze input data (i.e., data that is not associated with a training protocol). In contrast, "training" generally refers to sequences involved in developing the neural network for production.

As discussed herein, an "object" or "feature" may appear in or be contained within an image. For example, a car (object) may appear within a picture (image) of a landscape (collection of objects). An example of the feature may include a line, a curve, and intensity, color, and other particular properties of within an image. In some embodiments, the terms "object" and "feature" are interchangeable, and generally synonymous.

As discussed herein, the term "label" and other similar terms generally refer to annotation of images or image data with related information. Examples of label information include image scoring information. In the example disclosed herein, the image data is "label free." That is, it is not required that any additional information, such as annotation information, accompany image data.

As discussed herein, the term "server" generally refers to a computing resource that has robust computational resources. Exemplary resources include those important for performing tasks described herein, and may include substantial memory, processing capabilities, data storage and the like. In exemplary embodiments, the server includes a conventional server (such as a blade server) a mainframe, a network of personal computers, or simply a personal computer (PC). A server may be remote from another device, such as a mobile device used for input. One example of an input device is a smartphone.

As discussed herein, the term "mobile device" generally refers to the computing resource that is configured for mobile use. Quite often, a device that is configured as a mobile device will have a reduced set of computational resources. Accordingly, various embodiments of mobile devices may maintain communication with a server to supplement computing capabilities. Examples of mobile devices include: a smart phone, a tablet computer, and/or a specialized device.

As discussed herein, the term "image signal processor (ISP)" generally refers to a sensor configured for sensing imaging data. The image signal processor (ISP) may include a sensor such as a charge coupled device (CCD), a complementary metal oxide semiconductor (CMOS) or other type of device. The image signal processor (ISP) may further include at least one processor, power supply, memory and other components necessary for processing image data and providing output. In some embodiments, the image signal processor (ISP) includes a mobile device. In some embodiments, the image signal processor (ISP) is provided in a distributed model (e.g., at least some of the processing is conducted by a remote system).

As discussed herein, the term "client" generally refers to a computing resource that has a reduced set of computational resources. Exemplary resources include those important for performing tasks described herein, and may include a minimal amount of memory, processing capabilities, data storage and the like. In some embodiments, the client includes imaging capabilities to provide for collection of input images that are input into the neural network. In some embodiments, the client is configured for use on a mobile device and communicates with more robust, complimentary resources that operate on a remote server.

As discussed herein, the terms "program," "software," "application," "add-in," and other similar terms refer to machine executable instructions stored on non-transitory machine readable media. The machine executable instructions provide for execution of a method through control of computing resources and any associated components deemed appropriate.

As discussed herein, the terms "video," "movie," and other similar terms generally refer to a series of images.

In the exemplary embodiments, the methods and apparatus disclosed herein are useful for performing image quality assessment with a neural network. The neural network is configured with a comparative layer configured for making comparisons of data, such as image data. However, the exemplary embodiments are to be considered as merely illustrative and are not limiting of the teachings herein. Accordingly, the methods and apparatus disclosed may be used equally well for other applications involving use of neural networks and where comparative analyses of data are desired.

Figure 1:
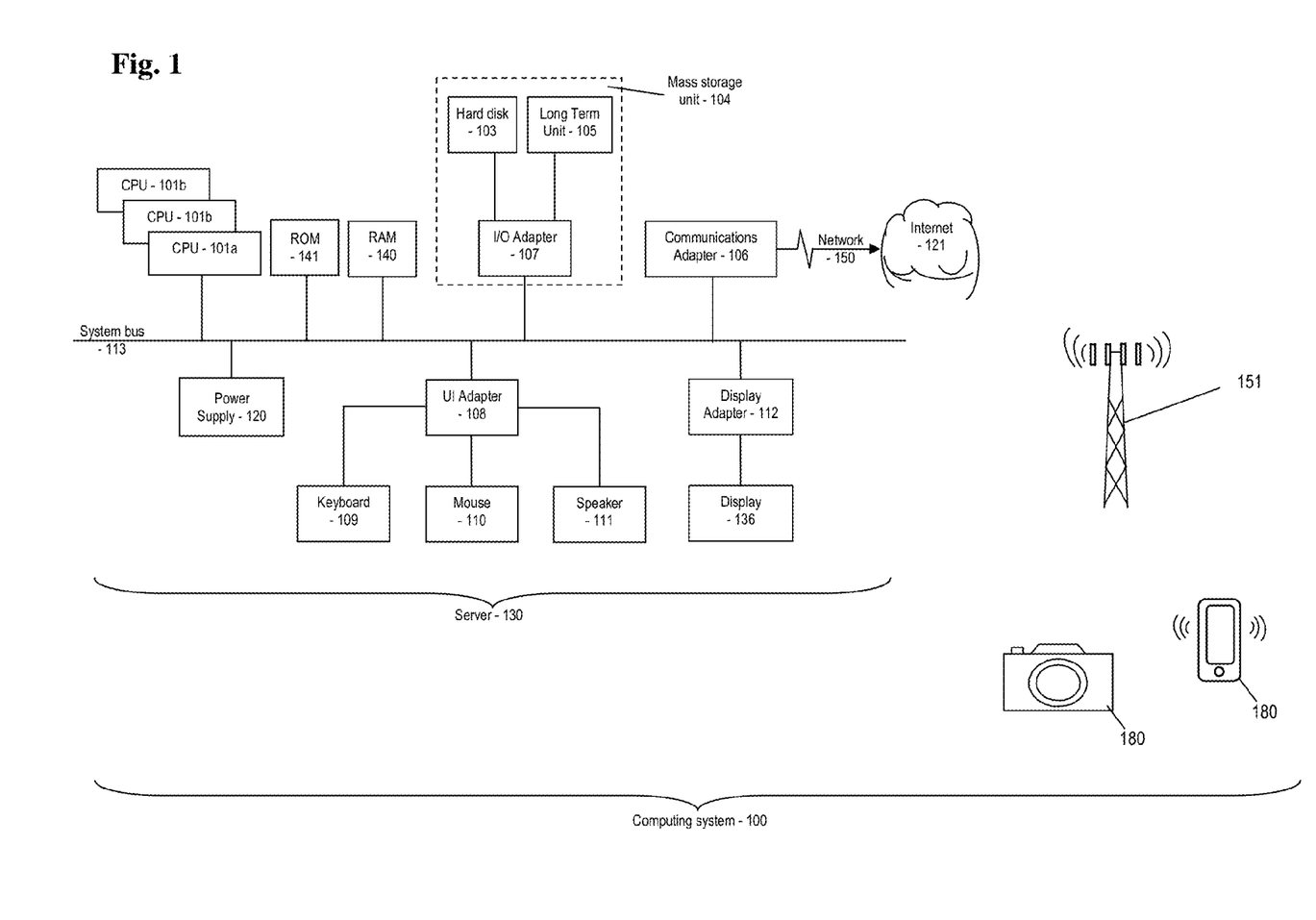
FIG. 1 is a block diagram of computing resources suited for performing image quality assessments as disclosed herein.

Referring now to FIG. 1, aspects of an illustrative and non-limiting embodiment of a computing system 100 are depicted. In this example, computing system 100 includes a server 130. The server 130 has one or more central processing units (processors) 101a, 101b, 101c, etc. (collectively or generically referred to as processor(s) 101). Processors 101 are coupled to random access memory (RAM) 140 (also referred to as "system memory," or simply as "memory") and various other components via a system bus 113. The computing system 100 may include read only memory (ROM) 141 coupled to the system bus 113. The ROM 141 may include a built-in operating system (BIOS), which controls certain basic functions of computer 100.

FIG. 1 further depicts an input/output (I/O) adapter 107 and a communications adapter 106 coupled to the system bus 113. I/O adapter 107 may include parallel ATA (PATA, also called IDE or EIDE), Serial ATA (SATA), SCSI, Serial Attached SCSI (SAS), and Fibre Channel, or include any other type of interface deemed appropriate. The I/O adapter 107 generally provides for communicating with a hard disk 103 and/or long term storage unit 105 (such as a tape drive) or any other similar component (such as an optical drive). I/O adapter 107, hard disk 103, and long term storage unit 105 (and other similar components as may be included) are collectively referred to herein as mass storage 104.

A communications adapter 106 interconnects system bus 113 with an outside network 150 enabling server 130 to communicate with other systems. The communications adapter 106 may be supportive of at least one of wired and wireless communication protocols. For example, the communications adapter 106 may support protocols such as wired Ethernet, wi-fi (e.g., 802.11 protocols), UMTS, dial-up, active-sync, cellular (using protocols such as, for example, GSM, GPRS, EDGE, CDMA, TDMA, 3G, 4G, and the like). Generally, the communications adapter 106 communicates with network 150, and may communicate (directly or indirectly) with the Internet 121.

The server 130 is powered by a suitable power supply 120. In some embodiments, the power supply 120 includes at least one transformer for receiving alternating current (AC) and transforming the AC into a suitable form of direct current (DC). In other embodiments, the power supply 120 includes at least one battery. The power supply may include appropriate circuitry for receiving and controlling various forms of input power.

Input/output devices are shown as connected to system bus 113 via user interface (UI) adapter 108. A keyboard 109, a pointing device 110 (e.g., a mouse), and speaker 111 may be included and interconnected to system bus 113 via user interface adapter 108. Other user interface components may be included as deemed appropriate.

A display adapter 112 connects display monitor 136 is connected to system bus 113. The display adapter 112 and/or display monitor may be configured with various components, such as a graphics adapter to improve the performance of graphics intensive applications, a video controller, a capacitive (i.e., touch screen) display, and the like. The display monitor 136 may be used to display the user interface 501.

In some embodiments, adapters 106, 107, 108 and 112 may be connected to one or more input/output (I/O) busses that are connected to system bus 113 via an intermediate bus bridge (not shown). Suitable I/O buses for connecting peripheral devices such as hard disk controllers, network adapters, and graphics adapters may include common protocols, such as the Peripheral Components Interface (PCI) bus.

Generally, the computing system 100 stores machine readable instructions on non-transitory machine readable media (such as in ROM, RAM, or in the mass storage unit 104). The machine readable instructions (which may be referred to herein as "software," as an "application," as a "client, a "process," a "plug-in" and by other similar terms) generally provide for functionality as will be discussed in detail further herein.

The computing system 100 may include additional components. The additional components may serve other functions as well. For example, the computing system 100 may take advantage of or rely upon a third-party communication system 151. For simplicity, the third-party communication system 151 is also referred to herein as a "system operator" 151. Additionally, the computing system 100 may include at least one image signal processing (ISP) device 180. The at least one image signal processing (ISP) device 180 may include a mobile device such as a smart phone. Illustrative embodiments of smartphone devices include the IPHONE from Apple Corp. of Cupertino, Calif., devices operating on the ANDROID platform of Google Corp. of Mountain View, Calif., as well as devices operating in the WINDOWS environment provided by Microsoft Corp. of Redmond, Wash. Other embodiments of the image signal processing (ISP) device 180 may include a camera, a tablet computer, a specialized device, and generally any type of device equipped or configured to implement the teachings herein.

In illustrative embodiments, the at least one image signal processing (ISP) device 180 includes components similar to those found in the server 130. For example, the at least one image signal processing (ISP) device 180 includes at least one central processing unit (CPU). The central processing unit (CPU) is connected to or in communication with other components through an internal system bus. Examples of other components within the image signal processing (ISP) device 180 include a power supply, memory, software, user controls, a display, a camera (that may be a front facing or a rear facing camera), a lamp, and a communication interface.

The CPU may be an ARM or other processor. The power supply may be from a battery or a source of direct current (DC), such as a transformer coupled to a conventional alternating current (AC) outlet. User controls may include a home button and an on/off switch. The display may include at least one of LCD, LED, OLED, AMOLED, IPS and other technologies. Lamp may be a light emitting diode (LED).

The communication interface may include a wired interface and/or a wireless interface. The wireless interface may include a wireless service processor. Illustrative wireless interfaces may make use of a protocol such as cellular, Bluetooth, Wi-Fi, near field technology (NFC), ZigBee, or other technology. Communication services provided over the wireless communication interface may include Wi-Fi, Bluetooth, Ethernet, DSL, LTE, PCS, 2G, 3G, 4G, LAN, CDMA, TDMA, GSM, WDM and WLAN. The communication interface 23 may include an auditory channel. That is, the communication interface may include a microphone for receiving voice commands, and may further include a speaker. In some embodiments, the speaker may provide an auditory signal when a barcode has been read. The communication interface may further include a status light or other such visual indicators.

The communication interface provides for, among other things, voice communications as well as data communications. The data communications may be used to provide for communication of software and data (such as at least one image; results of analyses, and other such types of data). Communication through the communication interface may be bi-directional or in a single direction.

The image signal processing (ISP) device 180 may include additional components such as sensors. Examples of sensors may include an accelerometer that provides for orientation information and a GPS sensor that provides for location information. The mobile device may also include peripheral interface and communication ports.

In some embodiments of the server 130, the machine readable instructions stored therein include drivers configured for communicating with other components. For example, the drivers may enable the server 130 to communicate with the camera and/or sensors of the mobile device 180.

Some of the machine readable instructions stored on non-transitory machine readable media may include an operating environment. For example, and as presented herein, a suitable operating environment is WINDOWS (available from Microsoft Corporation of Redmond Wash.). Software as provided herein may be developed in, for example, SQL language, which is a cross-vendor query language for managing relational databases. Aspects of the software may be implemented with other software. For example, user interfaces may be provided in XML, HTML and the like.

The computing system 100 may include, or exclude, as appropriate, the foregoing components and other components. For example, other components such as routers, bridges, firewalls, switches, other servers, middleware and other components may be available. Some components may be implemented in software and/or hardware. In some embodiments, the term "server" refers to a software engine running on hardware that may perform other functions as well.

The computing system 100 may include a plurality of computers. For example, in the computing system 100, at least one computer in the plurality may include substantial storage, memory, processors, mass storage and the like. Other devices, such as mobile device 180 may include a reduced set of components. At least one computer in the plurality may be designed with mobility as a primary purpose. For example, memory may replace a hard disk due to a physically compact nature of the memory. Other embodiments of the mobile device 180 include a tablet computer, a scanner, and anyone of a number of specialized devices. Non-limiting examples of specialized devices include application-specific devices designed for machine vision.

A particular computer in the computing system 100 may be purpose-oriented. For example, a computing infrastructure may use one computer principally as a file server (i.e., a data storage device for efficient storing of data within the computing infrastructure), a plurality of other computers as input devices (e.g., as mobile stations operated remotely by users for interfacing with the computing infrastructure), as a console (e.g., a dedicated system for managing the computing infrastructure), and the like.

It should be recognized that some functionality as may be described herein may be implemented by hardware (such as by the foregoing components), or by software, as appropriate. Accordingly, where reference is made to implementation in one manner or another, such implementation is merely illustrative and is not limiting of techniques described. In short, the foregoing description of the computing system 100, and systems making use of the computing system 100, merely provide an environment for the teachings herein and is not to be construed as limiting, but as illustrative of aspects of the computing system 100.

Generally, the computing system 100 implements a software solution that enables users to train and/or operate neural network systems. The computing system 100 may implement third party software systems for various purposes, such as communications, messaging, graphics editing, statistical analyses, and for other such purposes.

Figure 2:
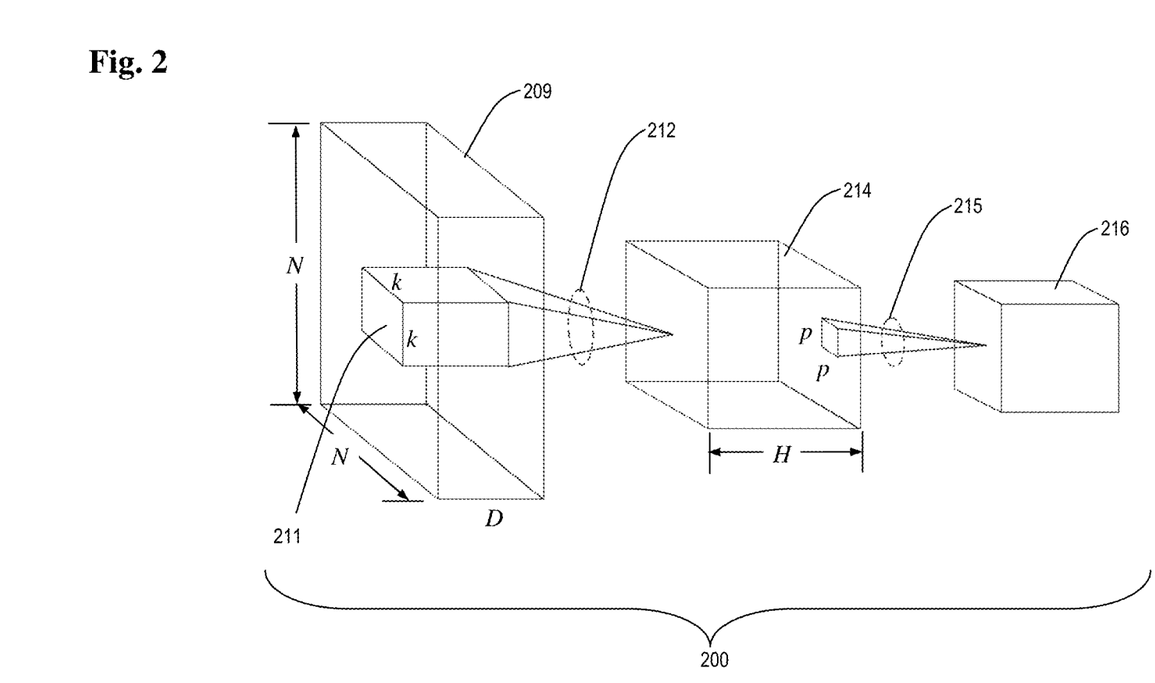
FIG. 2 is diagram depicting generalized aspects of a neural network.

FIG. 2 is a schematic diagram that is an abstraction for all illustrating basic aspects of a convolutional neural network (CNN) 200 useful for development of feature detectors and/or for decision making regarding identification of objects. The convolutional neural network (CNN) 200 may be provided as software, such as software that is stored in mass storage unit 104 of the server 130 and/or in data storage of the at least one mobile device 180. The convolutional neural network (CNN) 200 may be built using any application deemed appropriate. One application suited for coding the convolutional neural network (CNN) 200 is Python, which is open source software available from the Python Software Foundation of Beaverton, Oreg. As aspects of computer programming and coding are known, the mechanics of assembling the convolutional neural network (CNN) 200 are generally not discussed herein. Rather, aspects of the convolutional neural network (CNN) 200 are presented in functional terms understandable to one skilled in the art.

In this exemplary embodiment, and to provide some context, the convolutional neural network (CNN) 200 includes an input feature map 209, a convolution output layer 214, and a pooling layer 216. In this example, the input feature map 209 includes a three-dimensional input volume. The input feature map 209 is characterized by dimensions of N×N×D, where N represents height and width of the input, and D, represents depth of the input (for example, a number of hidden layers associated with the input feature map 209). A plurality of filters 211 are used to filter the input feature map 209. Each filter 211 is characterized by dimensions of k×k×D, where the additional variable, k, represents height and width of each filter 211. In this example, the height and the width of the input feature map 209 as well as each filter 211 are equivalent, and therefore the respective components are square. However, this is merely for simplicity and it should be recognized that the input feature map 209 and/or the filter 211 may be rectangular (and therefore the width may differ from the height for each of the respective components).

In operation of the convolutional neural network (CNN) 200, each filter 211 is shifted in a sliding window like fashion across the input feature map 209. The amount of shift is referred to as the "stride length," or simply as the "stride," s. During each shift, respective weighting belonging to a given filter 211 is multiplied and added with every pair-wise input element from the overlapping region of the input volume to provide convolution 212. After convolution 212, optional pooling layer 216 is used to subsample the convolved output by sliding a two-dimensional window across the three-dimensional convolved output and selecting the maximum (or average) value 215 over the window. In this example, the optional pooling layer 216 is defined by parameters p and s, where p×p defined the region for the pooling operation, and s represents the stride for the filter 211.

A given neural network is parameterized by the weights for each dimension of feature detectors. The learning process for each neural network involves learning those parameters from a set of training data such as images. In some embodiments, training makes use of back-propagation.

Figure 3A:
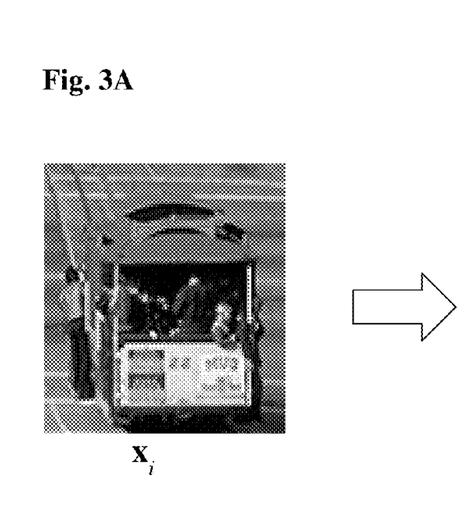
FIGS. 3A and 3B, collectively referred to herein as FIG. 3 are graphic images of an original image, $x_i$, (FIG. 3A) and a degraded image, $x_j$, (FIG. 3B)
Figure 3B:
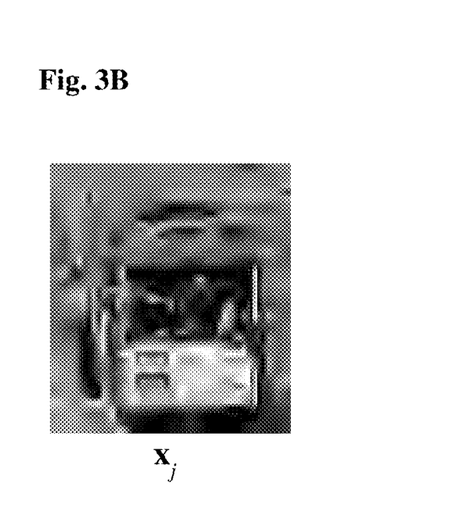

Turning now to FIG. 3, a pair of training images are shown. In FIG. 3A, an original image ($x_i$) is depicted. In FIG. 3B, a degraded image ($x_j$) is depicted. In producing the degraded image ($x_j$), the original image ($x_i$) is processed by a processing algorithm. The processing algorithm may randomly select features of the original image ($x_i$), such as, brightness, edge sharpness, color, blur and other such aspects. The processing algorithm may then adjust the randomly selected features by a randomly selected degree to provide the degraded image ($x_j$). No image quality score labeling is required with either one of the original image ($x_i$) or the degraded image ($x_j$).

Figure 4:
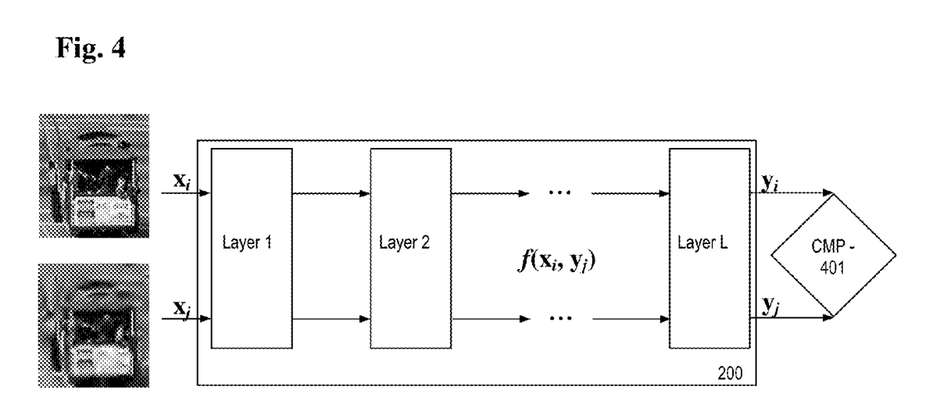
FIG. 4 is a graphic depicting aspects of image processing with a deep convolutional neural network.

Refer now to FIG. 4 which provides an overview of the process for non-reference image quality assessment (NRIQA). As shown in FIG. 4, the original image ($x_i$) and the degraded image ($x_j$) are provided as inputs to a comparative layer. The input images may be entire images or patches of images is deemed appropriate. It is assumed that quality of the original image ($x_i$) will always exceed the quality of the degraded image ($x_j$).

Processing makes use of the convolutional neural network (CNN) 200, with an additional comparative layer 401 integrated there within. The comparative layer 401 receives processing from upstream within the convolutional neural network (CNN) 200, and employs a cost function to maximize the probability that the output fits the assumption that quality of the original image ($x_i$) will always exceed the quality of the degraded image ($x_j$).

In one example, layer 1 includes 64 filters, where the kernel for each filter is 5×5. Each kernel is used to swipe each image and produce a response for the filter. This process is completed for each of the filters within the layer and a final representation is produced. The final representations are provided to at least one pooling layer. The process may be repeated any number of times that is deemed appropriate, with the final representation being fed to the comparative layer 401. As a matter of convention, embodiments of neural networks that includes the comparative layer 401 are generally referred to herein as a "NRIQA neural network."

The NRIQA neural network receives a pair of images $x_i$ and $x_j$ as input (where one image $x_i$ has a superior quality to the second image $x_j$), and outputs two quality scores, $y_i$ and $y_j$. In one embodiment, the comparative layer 401 enhances the probability that the image quality of $y_i$ exceed that of $y_j$ (denoted as $y_i > y_j$), by using a sigmoid function. An example of the sigmoid function is provided as Eq (1).

$$h(y_i, y_j) = \frac{1}{1 + e^{l_{i,j}(y_i - y_j)}}. \quad (1)$$

In Eq (1), $l_{i,j}$ represents the prior information of the pairwise ranking of $y_i$ and $y_j$ output by the comparative layer 401. If $l_{i,j}=+1$, it is known that $x_i$ is better than $x_j$, and $y_i > y_j$ is thus expected as output. If $l_{i,j}=-1$, $y_i < y_j$ is expected as output. If $l_{i,j}=0$, $y_i \approx y_j$ is expected as output. In this case, it is assumed that there is no prior knowledge of the ranking for $y_i$ and $y_j$.

Figure 5:
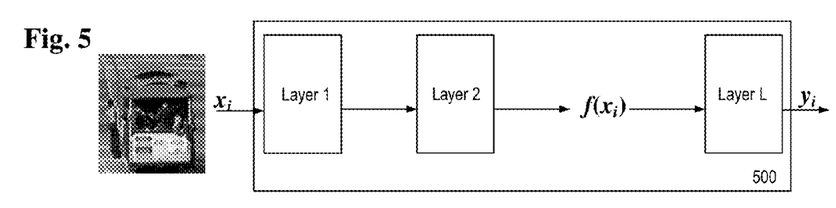
FIG. 5 is a graphic depicting implementation of a trained non-reference image quality assessment (NRIQA) neural network.
Figure 6A:
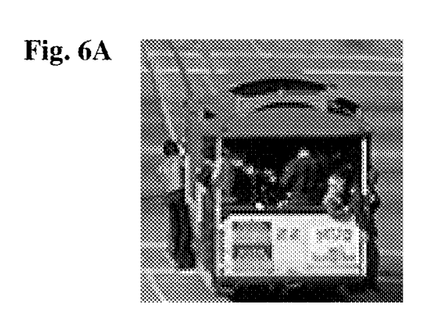
FIGS. 6A, 6B, 6C, 6D and 6E, collectively referred to herein as FIG. 6, are duplicate images containing varying degrees of distortion.
Figure 6B:
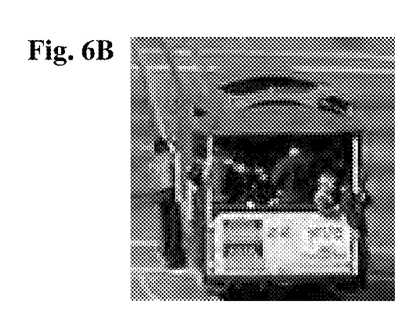
Figure 6C:
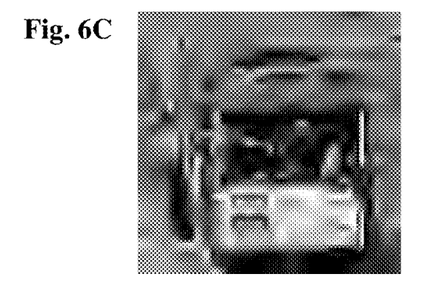
Figure 6D:
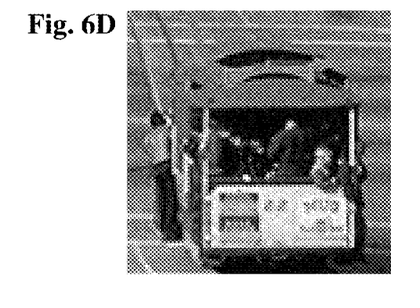
Figure 6E:
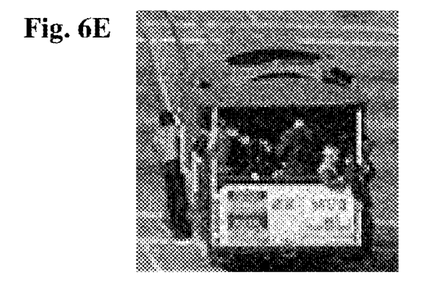

An exemplary embodiment of a set of learning rules for the comparative layer 401 is provided below in Eqs. (2-4).

$$\frac{\partial}{\partial y_i} = -l_{i,j} \frac{1}{1 + e^{l_{i,j}(y_i - y_j)}} \left(1 - \frac{1}{1 + e^{l_{i,j}(y_i - y_j)}}\right); \quad (2)$$

$$\frac{\partial}{\partial y_j} = l_{i,j} \frac{1}{1 + e^{l_{i,j}(y_i - y_j)}} \left(1 - \frac{1}{1 + e^{l_{i,j}(y_i - y_j)}}\right); \quad (3)$$

$$\frac{\partial}{\partial f} = \quad (4)$$

$$\Sigma_{i,j} - \frac{1}{1 + e^{l_{i,j}(f(x_i) - f(x_j))}} \left(1 - \frac{1}{1 + e^{l_{i,j}(f(x_i) - f(x_j))}}\right) l_{i,j} \frac{\partial (f(x_i) - f(x_j))}{\partial f}.$$

wherein $f$ represents the function consisting of weights that map input (image or patches) to output (quality score) for internal layers of the neural network. As mentioned above, the neural network may be trained using back propagation techniques, which may be performed on a layer by layer basis. After the model has been learned, the model may be used to assess the quality of input images. Once into production, images do not need to be supplied in pairs and comparative layer is not necessary. Reference maybe had to FIG. 5.

In FIG. 5, aspects of a testing scheme for the NRIQA neural network 500 are shown. In this example, test images (or portions of complete images, also referred to herein as "patches") are fed into the NRIQA neural network 500. Note, under the testing scheme, the test images do not need to be supplied in pairs. The NRIQA neural network 500 provides users with a quality score as output. Reference may be had to FIG. 6.

In FIG. 6, five (5) versions of one image are depicted. The five (5) versions of the one image were scored by a trained embodiment of the NRIQA neural network 500. FIG. 6A received a score of 76. This image was known to be the highest quality image. FIGS. 6B through 6E were provided to the NRIQA neural network 500 with various types of embedded noise or distortion. The score provided by the NRIQA neural network 500 for the image in FIG. 6B was 44; FIG. 6C attained a score of 16; FIG. 6D attained a score of 31; and FIG. 6E attained a score of 14. FIG. 6A was the original image; FIG. 6B was a version of the original image that was image compressed during pre-processing with JPEG 2000 bpp=0.297; FIG. 6C was a version of the original image that was image compressed during pre-processing with JPEG 2000 bpp=0.028; FIG. 6D was a version of the original image with Gaussian noise σ=0.1549 added in pre-processing; and; FIG. 6E was a version of the original image that with Gaussian noise σ=2.0 added in pre-processing.

Evaluation of test images was conducted to provide for validation of the disclosed techniques. In the experiment, the dataset included images from CSIQ dataset, which is a standardized database. That is, the CSIQ dataset consists of 30 original images. Each image is distorted using six different types of distortions at four to five different levels of distortion. The distortion includes additive Gaussian noise, JPEG compression and other types of distortion. The dataset includes 30-fold cross validation, where each fold contains one image and all of the associated distorted images. CSIQ images are subjectively rated base on a linear displacement of the images across four calibrated LCD monitors placed side by side with equal viewing distance to the observer. The database contains 5000 subjective ratings from 35 different observers, and ratings are reported in the form of DMOS.

In the experiment, the NRIQA neural network 500 was trained with 90 epochs, and the learning rate was 0.001.

The experimental result for the NRIQA neural network 500 was 89.78% accuracy on patch level and 97.78% accuracy on image level (via majority voting). The NRIQA neural network 500 was also tested on TID 2008 dataset reporting 86.51% on patch level and 93.85% on image level.

In comparison, existing state-of-art methods achieve 92.0% image level accuracy on TID 2008 (Convolutional Neural Networks for No-Reference Image Quality Assessment) and 93.59% image level accuracy on CSIQ (with Information Content Weighting for Perceptual Image Quality Assessment).

Having thus introduced aspects of a NRIQA neural network 500, some additional features and embodiments are now presented.

The disclosed techniques may be used to provide for automatic tuning of image signal processing (ISP). More specifically, and by way of non-limiting example, is recognized that image signal processing (ISP) can involve many parameters, in some cases hundreds of parameters. Existing techniques for image signal processing (ISP) involve substantial manual effort. Such image signal processing (ISP) techniques are substantially labor-intensive, produce subjective results, and are slow to execute. Advantageously, the techniques disclosed herein provide for substantially reducing manual input (i.e., human interaction) and therefore provide for automatic adjustment of image signal processing (ISP).

Figure 7:
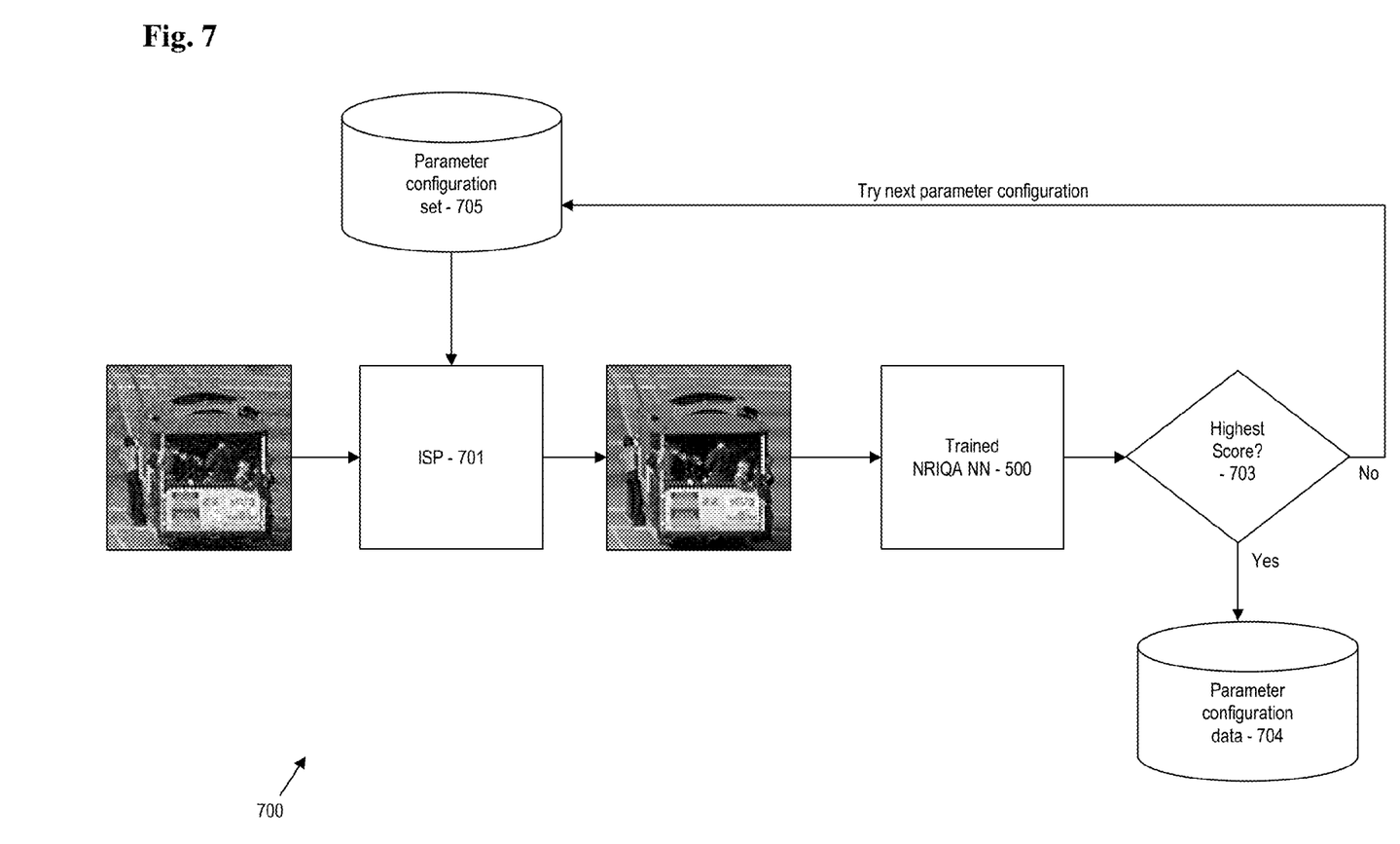
FIG. 7 is a flowchart depicting aspects of a method for tuning image signal processing.

An exemplary process for adjustment of image signal processing (ISP) is set forth in FIG. 7. In the method for image signal processing (ISP) 700, an initial image is collected by an image signal processor 701. The image signal processor 701 produces output image, $x_i$. The output image, $x_i$, is provided as input to the trained NRIQA neural network 500. At step 703, a score test is performed. Initially, if the score associated with output image, $x_i$, exceeds a threshold value, then the settings for the parameters controlling the image signal processor 701 are stored in a parameter configuration data base 704. Once an adequate history has been accrued, the score test may simply provide comparisons between scores for newly collected images versus other recently collected images. In either case, if the result of the score test is deemed inadequate, then the settings for the parameters controlling the image signal processor 701 may be automatically adjusted by a controller (not shown). Once the settings for the parameters have been adjusted, a new image is collected, the images scored, and the score test is performed again.

Accordingly, the method for image signal processing (ISP) 700 provides for dynamic adjustment of an image signal processor 701 and image signal processing. As a result, implementation of the trained NRIQA neural network 500 in conjunction with a controller configured for controlling image signal processing provides for substantially improved image quality. Advantageously, the substantially improved image quality occurs "in the background," thus permitting users to concentrate on other aspects of their assigned tasks. For example, an artist such as a movie producer may better concentrate on artistic content, a doctor may better evaluate diagnostic data, security personnel are better afforded opportunities to identify security targets.

In another embodiment, automatic tuning of the image signal processor 701 commences with a training routine. In the training routine, a set of images are prepared as targeting images. The set of parameters to be tuned and their potential ranges and values are specified and stored as parameter configuration data 704. Subsequently, image signal processing is applied to each of the images. The trained NRIQA neural network 500 is used to evaluate the qualities of the images output from the image signal processing 701. The parameter configuration for the imaging apparatus that is associated with the highest quality images is stored and used for subsequent imaging.

Various other components may be included and called upon for providing for aspects of the teachings herein. For example, additional materials, combinations of materials and/or omission of materials may be used to provide for added embodiments that are within the scope of the teachings herein.

When introducing elements herein, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The term "exemplary" should be construed to mean one of many possible examples. That is, the term "exemplary" should not be construed as indicating a superlative embodiment.

While the disclosure has set forth exemplary embodiments, it will be understood by those skilled in the art that various changes may be made and equivalents may be substituted for elements thereof without departing from the scope of the subject matter disclosed. In addition, many modifications will be appreciated by those skilled in the art to adapt a particular instrument, situation or material to the teachings herein without departing from the essential scope thereof. Therefore, it is intended that the teachings herein are not limited to the particular embodiments disclosed as the best mode, but that all embodiments falling within the scope of the appended claims are included.

What is claimed is:

1. A method for training a neural network to perform assessments of image quality, the method comprising:
   inputting into the neural network at least one set of images, each set comprising an image and at least one degraded version of the image;
   performing in a comparative layer a comparative ranking of each image in the at least one set of images by implementing a sigmoid function to provide pairwise ranking of the images within each set of images, the sigmoid function comprising:

$$h(y_i, y_j) = \frac{1}{1 + e^{l_{i,j}(y_i - y_j)}}$$

wherein, $y_i$ and $y_j$ represent output quality scores associated with input images, $x_i$ and $x_j$, respectively; and $l_{i,j}$ represents prior information for pairwise ranking of $y_i$ and $y_j$ output by the comparative layer; and
   training the neural network with the ranking information.

2. The method as in claim 1, wherein learning rules for the comparative layer comprise:

$$\frac{\partial}{\partial y_i} = -l_{i,j}\frac{1}{1+e^{l_{i,j}(y_i-y_j)}}\left(1-\frac{1}{1+e^{l_{i,j}(y_i-y_j)}}\right);$$

$$\frac{\partial}{\partial y_j} = l_{i,j}\frac{1}{1+e^{l_{i,j}(y_i-y_j)}}\left(1-\frac{1}{1+e^{l_{i,j}(y_i-y_j)}}\right); \text{ and}$$

$$\frac{\partial}{\partial f} = -\frac{1}{1+e^{l_{i,j}(f(x_i)-f(x_j))}}\left(1-\frac{1}{1+e^{l_{i,j}(f(x_i)-f(x_j))}}\right)l_{i,j}\frac{\partial(f(x_i)-f(x_j))}{\partial f},$$

wherein $f$ represents function mapping input to output quality scores for layers of the neural network.

3. The method as in claim 1, wherein each image within each set of images is label-free.

4. The method as in claim 1, wherein the training comprises back propagation of the neural network.

5. The method as in claim 1, further comprising providing the degraded image by degrading the image with a pre-processing algorithm.

6. A system configured for performing assessments of image quality, the system comprising:
an image signal processor to output at least one set of training images, each set of training images comprising a first image and a degraded version of the first image;
a neural network comprising:
an input for receiving the at least one set of training images output from the image signal processor; and
a comparative layer configured for performing comparative ranking of each image in the at least one set of training images for image quality assessment, the comparative layer implementing a sigmoid function to provide pairwise ranking of the images within each set of training images, the sigmoid function comprising:

$$h(y_i, y_j) = \frac{1}{1+e^{l_{i,j}(y_i-y_j)}}$$

wherein, $y_i$ and $y_j$ represent output quality scores associated with input images, and $x_i$ and $x_j$, respectively; and $l_{i,j}$ represents prior information for pairwise ranking of $y_i$ and $y_j$ output by the comparative layer;
wherein the neural network configured to learn image quality scoring from the rankings performed by the comparative layer, and
wherein parameters of the image signal processor (ISP) being adjusted based on the image quality scoring from the rankings performed by the comparative layer.

7. The neural network system as in claim 6, wherein learning rules for the comparative layer comprise:

$$\frac{\partial}{\partial y_i} = -l_{i,j}\frac{1}{1+e^{l_{i,j}(y_i-y_j)}}\left(1-\frac{1}{1+e^{l_{i,j}(y_i-y_j)}}\right);$$

$$\frac{\partial}{\partial y_j} = l_{i,j}\frac{1}{1+e^{l_{i,j}(y_i-y_j)}}\left(1-\frac{1}{1+e^{l_{i,j}(y_i-y_j)}}\right); \text{ and}$$

$$\frac{\partial}{\partial f} = -\frac{1}{1+e^{l_{i,j}(f(x_i)-f(x_j))}}\left(1-\frac{1}{1+e^{l_{i,j}(f(x_i)-f(x_j))}}\right)l_{i,j}\frac{\partial(f(x_i)-f(x_j))}{\partial f},$$

wherein $f$ represents function consisting of weights mapping input to output quality scores for layers of the neural network.

8. The system as in claim 6, wherein output of the neural network is configured for use by an automated image signal processing tuning system.

9. An image signal processing tuning system, comprising:
an image signal processor (ISP) adapted for providing at least one set of training images to a neural network, each set of training images comprising a first image and a degraded version of the first image;
the neural network configured for performing comparative ranking of each training image in the at least one set of training images by implementing a sigmoid function to provide pairwise ranking of the images within each set of images, the sigmoid function comprising:

$$h(y_i, y_j) = \frac{1}{1+e^{l_{i,j}(y_i-y_j)}}$$

wherein, $y_i$ and $y_j$ represent output quality scores associated with input images, $x_i$ and $x_j$, respectively; and $l_{i,j}$ represents prior information for pairwise ranking of $y_i$ and $y_j$ output by the comparative layer; and
a controller configured for receiving ranking information and adjusting settings of parameters of the image signal processor (ISP) according to the ranking information.

10. The image signal processing tuning system of claim 9, wherein the image signal processor (ISP) is configured to provide production images that are unrelated to the training images.

11. The image signal processing tuning system of claim 10, wherein the neural network is further configured provide image scoring information for the production images.

12. The image signal processing tuning system of claim 11, wherein the image scoring information is provided to the controller for adjusting settings of parameters of the image signal processor (ISP) according to the image scoring information.

13. The image signal processing tuning system of claim 9, wherein the image signal processor (ISP) is equipped with an imaging sensor and comprises one of:
a camera, a mobile device, a smart phone, a tablet, and a specialized device.

14. The image signal processing tuning system of claim 9, wherein the controller is implemented by a set of machine-readable instructions stored on non-transitory machine-readable media.

15. The image signal processing tuning system of claim 9, wherein learning rules for the comparative layer comprise:

$$\frac{\partial}{\partial y_i} = -l_{i,j}\frac{1}{1+e^{l_{i,j}(y_i-y_j)}}\left(1-\frac{1}{1+e^{l_{i,j}(y_i-y_j)}}\right);$$

$$\frac{\partial}{\partial y_j} = l_{i,j}\frac{1}{1+e^{l_{i,j}(y_i-y_j)}}\left(1-\frac{1}{1+e^{l_{i,j}(y_i-y_j)}}\right); \text{ and}$$

$$\frac{\partial}{\partial f} = -\frac{1}{1+e^{l_{i,j}(f(x_i)-f(x_j))}}\left(1-\frac{1}{1+e^{l_{i,j}(f(x_i)-f(x_j))}}\right)l_{i,j}\frac{\partial(f(x_i)-f(x_j))}{\partial f},$$

wherein $f$ represents function mapping input to output quality scores for layers of the neural network.

* * * * *